(12) United States Patent
Obata et al.

(10) Patent No.: US 8,400,578 B2
(45) Date of Patent: Mar. 19, 2013

(54) OPTICAL FILM, METHOD OF MANUFACTURING THE SAME, AND DISPLAY UNIT

(75) Inventors: Kei Obata, Miyagi (JP); Mitsunari Hoshi, Miyagi (JP); Jun Shimizu, Miyagi (JP)

(73) Assignee: Sony Corporation, Tokyo (JP)

( * ) Notice: Subject to any disclaimer, the term of this patent is extended or adjusted under 35 U.S.C. 154(b) by 801 days.

(21) Appl. No.: 12/534,989

(22) Filed: Aug. 4, 2009

(65) Prior Publication Data
US 2010/0026610 A1 Feb. 4, 2010

(30) Foreign Application Priority Data
Aug. 4, 2008 (JP) .................... 2008-200671

(51) Int. Cl.
*G02F 1/1335* (2006.01)
(52) U.S. Cl. .......................... 349/57; 349/95
(58) Field of Classification Search ............ 349/57, 349/62, 95, 193
See application file for complete search history.

(56) References Cited

U.S. PATENT DOCUMENTS

| 5,402,324 A * | 3/1995 | Yokoyama et al. ............ 362/19 |
| 2006/0138702 A1 | 6/2006 | Biernath et al. | |

FOREIGN PATENT DOCUMENTS

| JP | 1273002 | 10/1989 |
| JP | 2000-221324 | 8/2000 |
| JP | 2004-037480 | 2/2004 |
| JP | 2006-119258 | 5/2006 |
| JP | 2007-041583 | 2/2007 |
| JP | 2007-206104 | 8/2007 |
| JP | 2007-213057 | 8/2007 |
| JP | 2007-256493 | 10/2007 |
| JP | 2008-525230 | 7/2008 |
| JP | 2009-109840 | 5/2009 |

OTHER PUBLICATIONS

Japanese Patent Office, Notice of reasons for refusal, issued in connection with Japanese Patent Application No. 2008-200671, dated May 30, 2012. (5 pages).
Office Action issued Oct. 3, 2012 in corresponding Japanese Appln. No. 2008-200671.

* cited by examiner

*Primary Examiner* — James Dudek
(74) *Attorney, Agent, or Firm* — K&L Gates LLP

(57) ABSTRACT

An optical film capable of improving luminance of a display unit, in which a viewing angle in the horizontal direction of emitted light of the display unit is wider than a viewing angle in the vertical direction and the emitted light of the display unit has a polarization component in the vertical direction viewable by polarized sunglasses, an illumination system including the same, and a display unit including the same are provided. The optical film includes a plurality of three-dimensional structures extending in one direction and arranged sequentially in a direction crossing the one direction. The three-dimensional structures contain a liquid crystalline polymer having orientation, and have refractive index anisotropy in which refractive index in the extending direction of the three-dimensional structures is smaller than refractive index in the direction crossing the extending direction of the three-dimensional structures.

6 Claims, 10 Drawing Sheets

OPTICAL FILM, METHOD OF MANUFACTURING THE SAME, AND DISPLAY UNIT

CROSS REFERENCES TO RELATED APPLICATIONS

The present application claims priority to Japanese Priority Patent Application JP 2008-200671 filed in the Japan Patent Office on Aug. 4, 2008, the entire content of which is hereby incorporated by reference.

BACKGROUND

The present application relates to an optical film having refractive index anisotropy, a method of manufacturing the same, and a display unit including an optical film having refractive index anisotropy.

In these years, cathode ray tubes (CRT) that were a mainstream of display units in the past have been replaced with liquid crystal displays, since the liquid crystal displays have advantages such as the low electrical power consumption, the space-saving feature, and the low cost.

There are several types of the liquid crystal displays when categorized by, for example, illumination methods in displaying images. Representative examples include a transmissive liquid crystal display that displays images by using a light source arranged behind a liquid crystal panel.

In such a display, it is extremely important to decrease the electrical power consumption and increase the display luminance in order to increase the commercial value of the display. Thus, it has been strongly aspired that the gain of the optical system provided between the liquid crystal panel and the light source is increased, while the electrical power consumption of the light source is kept low as much as possible.

For example, a technique that a prism sheet as a luminance enhancement film is provided between the liquid crystal panel and the light source has been disclosed. In the prism sheet, for example, a plurality of prisms in the shape of an isosceles triangle pole having an apex angle of 90 degrees are arranged in parallel on a resin film. The front luminance is able to be increased by using the light-focusing effect of the prisms. Further, a technique that prisms in which refractive index in the extending direction of the prisms is different from refractive index in the arrangement direction of the prisms are used in the foregoing prism sheet has been disclosed. In such a prism sheet, in addition to the light-focusing effect of the prisms, polarization split is performed on the inclined plane of the prisms by using interfacial reflection due to the difference of critical angles, and thereby the front luminance is able to be increased.

In the prism sheet having the polarization split function as described above may be fabricated as follows. For example, a plurality of columnar prisms are formed on one face of a sheet containing a semicrystalline resin or a crystalline resin. After that, the sheet is stretched in one in-plane direction (see Japanese Unexamined Patent Application Publication No. 01-273002 and U.S. Patent Publication No. 2006/0138702).

However, in the foregoing fabrication method, there has been a disadvantage that the shape of the prisms is easily collapsed in stretching, and accurately obtaining a desired structure is difficult. Further, in the foregoing fabrication method, to keep the original three dimensional shape even after stretching, it is necessary to stretch the sheet in the ridge line direction of the prisms. Further, in a positive resin with high refractive index in the stretching direction, a refractive index difference generated by stretching is generally larger than that of a negative resin with low refractive index in the stretching direction. Thus, to obtain high birefringence, the positive resin is generally used. Therefore, in the high-birefringent prism sheet fabricated by stretching, the refractive index in the ridge line direction is generally larger than the refractive index in the direction orthogonal to the ridge line direction.

SUMMARY

In general, in the liquid crystal display, to widen the viewing angle in the horizontal direction, the prism sheet is arranged so that the ridge line direction is horizontal. Therefore, in the case where the high-birefringent prism sheet fabricated by stretching is used, the prism sheet is also arranged so that the ridge line direction is horizontal. However in such a case, the transmission axis of the prism sheet becomes perpendicular polarization, which is orthogonal to the transmission axis of the polarizer arranged on the light incidence side of the liquid crystal panel. As a result, there is a disadvantage that the luminance is lowered.

Accordingly, it is considered that the transmission axis of the polarizer arranged on the light incidence side of the liquid crystal panel is set as the perpendicular polarization as in the transmission axis of the prism sheet. However, in this case, the transmission axis of the polarizer arranged on the light emitting side of the liquid crystal panel becomes horizontal polarization, and light that has been transmitted through the polarizer is difficult to be viewed by general polarized sunglasses.

In view of the foregoing, it is desirable to provide an optical film capable of further increasing luminance of a display unit in which a viewing angle in the horizontal direction of emitting light of the display unit is wider than a viewing angle in the vertical direction, and the emitting light of the display unit has a polarization component in the vertical direction viewable by polarized sunglasses; an illumination system including the optical film; and a display unit including the optical film.

According to an embodiment, there is provided an optical film including a plurality of three-dimensional structures extending in one direction and arranged sequentially in a direction crossing the one direction. The foregoing three-dimensional structures contain a liquid crystalline polymer having orientation. Further, the foregoing three-dimensional structures have refractive index anisotropy in which refractive index in the extending direction of the three-dimensional structures is smaller than refractive index in the direction crossing the extending direction of the three-dimensional structures. According to an embodiment of the application, there is provided a display unit including a panel driven based on an image signal, a pair of polarizers sandwiching the display panel, a light source illuminating the panel, and the foregoing optical film provided between the polarizer and the light source.

In the optical film and the display unit of the embodiment, the refractive index in the extending direction of the three-dimensional structures is smaller than refractive index in the direction crossing the extending direction of the three-dimensional structures. Thus, a polarizing axis of the optical film is oriented in the direction in parallel with the extending direction of the three-dimensional structures. "Oriented in the direction in parallel" is a concept including not only the case that the polarizing axis of the optical film is oriented in parallel with the extending direction of the three-dimensional structure, but also a case that the polarizing axis of the optical film is oriented in a direction crossing the extending direction of the three-dimensional structure at an angle within a range from 0 degrees to 45 degrees both inclusive. Further, the three-dimensional structure containing the liquid crystalline polymer having orientation may be formed by, for example, irradiating a composition of matter containing a rod-like liquid crystalline monomer having orientation in the arrangement direction of the three-dimensional structures and a photopolymerization initiator with ultraviolet, and thereby polymerizing the rod-like liquid crystalline monomer. Accordingly, the three-dimensional structures may be formed by the method other than stretching.

A method of manufacturing an optical film according to an embodiment includes the following two steps:

A. a first step of retaining a composition of matter containing a rod-like liquid crystalline monomer and a photopolymerization initiator between a base and a light transmission film, the base including a plurality of three-dimensional structures extending in one direction and arranged sequentially in a direction crossing the one direction, the light transmission film being arranged oppositely to the three-dimensional structures of the base, heating the composition of matter at temperature of a melting point of the rod-like liquid crystalline monomer or more, contacting a pressure roller with the light transmission film, rolling the pressure roller in the arrangement direction of the three-dimensional structures of the base, and thereby pressing the composition of matter; and B. a second step of cooling the composition of matter down to ambient temperature, irradiating the composition of matter with ultraviolet and thereby polymerizing the rod-like liquid crystalline monomer, and separating the light transmission film from the base.

In the method of manufacturing an optical film according to the embodiment, the rod-like liquid crystalline monomer in the composition of matter is heated at the melting point or more, and thereby the composition of matter becomes in a state of liquid. The composition of matter in a state of liquid is pressed and moved in the arrangement direction of the three-dimensional structures of the base, and the liquid crystal thereof is oriented. After that, by irradiating the composition of matter with ultraviolet, the rod-like liquid crystalline monomer is polymerized, and becomes a crystalline polymer having orientation in the arrangement direction of the three-dimensional structures of the base. Accordingly, in the method of manufacturing the optical film according to the embodiment of the application, refractive index anisotropy is able to be given to the composition of matter without using stretching. "In a direction being pressed and moved" includes not only the direction in which the composition of matter is pressed and moved, but also a direction crossing the direction in which the composition of matter is pressed and moved at an angle larger than 0 degrees and smaller than 45 degrees. As a result, in the composition of matter, the refractive index in the extending direction of the three-dimensional structure of the base becomes smaller than the refractive index in the direction crossing the extending direction of the three-dimensional structure of the base.

According to the optical film and the display unit of an embodiment, the refractive index in the extending direction of the three-dimensional structure is smaller than the refractive index in the direction crossing the extending direction of the three-dimensional structures. Thus, in the case where the optical film is arranged so that the extending direction of the three-dimensional structures becomes horizontal to widen the viewing angle in the horizontal direction, the polarizing axis of the optical film may be horizontal polarization. Thereby, in the case where one polarizer is arranged on the light incidence side of the liquid crystal panel so that the polarizing axis is in parallel with the polarizing axis of the optical film, and the other polarizer is arranged on the light emitting side of the liquid crystal panel so that the polarizing axis is orthogonal to the polarizing axis of the polarizer on the light incidence side to improve luminance of the display unit, the polarizing axis of the polarizer on the light emitting side of the liquid crystal panel becomes perpendicular polarization. Thus, light transmitted through the polarizer arranged on the light emitting side of the liquid crystal panel is viewed by general polarization sunglasses. Therefore, in the embodiment of the application, the viewing angle in the horizontal direction of emitted light of the display unit is wider than the viewing angle in the vertical direction. In addition, the emitted light of the display unit may have a polarization component in the vertical direction viewable by the polarization sunglasses, and luminance of the display unit may be improved. In the embodiment of the application, the liquid crystalline polymer having orientation is used, and thereby refractive index anisotropy is generated in the three-dimensional structures of the optical film. Therefore, the three-dimensional structures of the optical film have no shape deformation by stretching.

According to the method of manufacturing an optical film of an embodiment, after the composition of matter in a state of liquid containing the rod-like liquid crystalline monomer is pressed and moved in the arrangement direction of the three-dimensional structures of the base, the composition of matter is irradiated with ultraviolet and thereby the rod-like liquid crystalline monomer is polymerized, and accordingly the optical film containing the liquid crystalline polymer having orientation in the arrangement direction of the three-dimensional structures of the base is formed. Thus, in the case where the optical film is arranged so that the extending direction of the three-dimensional structures of the optical film becomes horizontal to widen the viewing angle in the horizontal direction, the polarizing axis of the optical film may be horizontal polarization. Thereby, in the case where one polarizer is arranged on the light incidence side of the liquid crystal panel so that the polarizing axis is in parallel with the polarizing axis of the optical film, and the other polarizer is arranged on the light emitting side of the liquid crystal panel so that the polarizing axis is orthogonal to the polarizing axis of the polarizer on the light incidence side to improve luminance of the display unit, the polarizing axis of the polarizer on the light emitting side of the liquid crystal panel becomes perpendicular polarization. Thus, light transmitted through the polarizer arranged on the light emitting side of the liquid crystal panel is viewed by general polarization sunglasses. Therefore, in the embodiment of the application, the viewing angle in the horizontal direction of emitted light of the display unit is wider than the viewing angle in the vertical direction. In addition, the emitted light of the display unit may have a polarization component in the vertical direction viewable by the polarization sunglasses, and luminance of the display unit may be improved. In the embodiment of the application, the liquid crystalline polymer having orientation is used, and thereby refractive index anisotropy is generated in the three-dimensional structures of the optical film. Therefore, the three-dimensional structures of the optical film have no shape deformation by stretching.

Other and further objects, features and advantages of the application will appear more fully from the following description.

Additional features and advantages are described herein, and will be apparent from the following Detailed Description and the figures.

DETAILED DESCRIPTION

The present application will be hereinafter described in detail with reference to the drawings, according to an embodiment.

Figure 1:
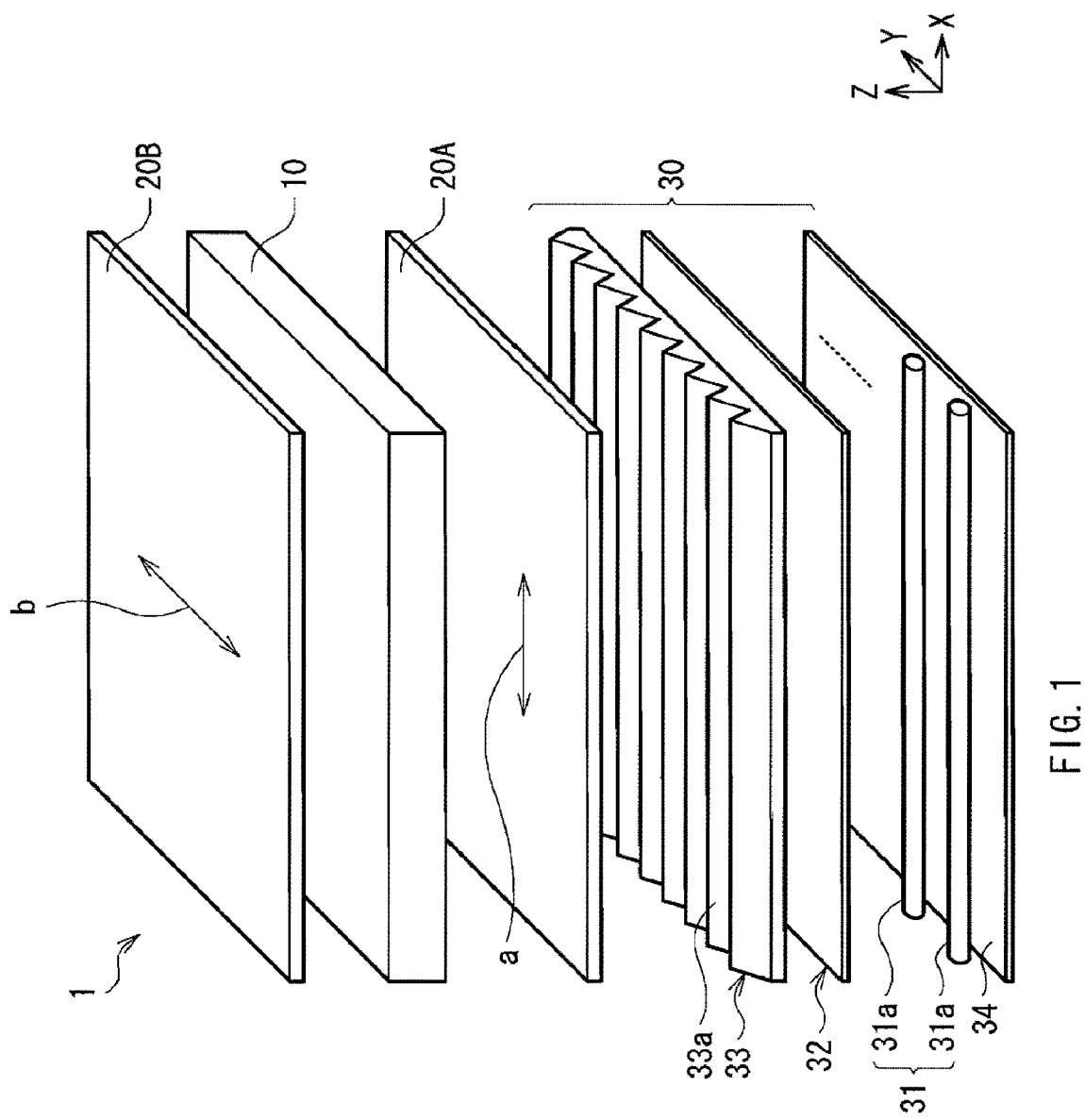
FIG. 1 is a development perspective view illustrating an example of a configuration of a display unit according to an embodiment of the application.

FIG. 1 illustrates a schematic configuration of a display unit 1 according to an embodiment of the application. The display unit 1 includes a liquid crystal display panel 10, a first polarizer 20A and a second polarizer 20B that sandwich the liquid crystal display panel 10, an illumination system 30 arranged behind the first polarizer 20A, and a drive circuit (not illustrated) for displaying a picture by driving the liquid crystal display panel 10. In the display unit 1, the front face of the second polarizer 20B is oriented to the observer side (not illustrated).

The liquid crystal display panel 10 is, for example, a transmissive display panel in which each pixel is driven in response a picture signal. The liquid crystal display panel 10 has a structure in which a liquid crystal layer is sandwiched between a pair of transparent substrates. Specifically, the liquid crystal display panel 10 has the transparent substrate, a color filter, a transparent electrode, an alignment film, the liquid crystal layer, an alignment film, a transparent pixel electrode, and the transparent substrate sequentially from the observer side.

In general, the transparent substrate is a substrate transparent to visible light. On the transparent substrate on the illumination system 30 side, an active drive circuit including a TFT (Thin Film Transistor) as a drive element electrically connected to the transparent pixel electrode, wiring and the like is formed. As the color filter, color filters for respectively separating light emitted from the illumination system 30 into three primary colors of red (R), green (G), and blue (B) are arranged. The transparent electrode is made of, for example, ITO (Indium Tin Oxide), and functions as a common opposed electrode. The alignment film is made of, for example, a polymer material such as polyimide, and performs alignment for the liquid crystal. The liquid crystal layer is made of, for example, VA (Vertical Alignment) mode liquid crystal, TN (Twisted Nematic) mode liquid crystal, or STN (Super Twisted Nematic) mode liquid crystal. The liquid crystal layer has a function to transmit or block light emitted from the illumination system 30 for every pixel by a voltage applied from a drive circuit (not illustrated). The transparent pixel electrode is made of, for example, ITO, and functions as an electrode for every pixel.

The first polarizer 20A is a polarizer arranged on the light incidence side of the liquid crystal display panel 10. The second polarizer 20B is a polarizer arranged on the light emitting side of the liquid crystal display panel 10. The first polarizer 20A and the second polarizer 20B are a kind of optical shutter, and transmit only light (polarized light) in a specific oscillation direction. The first polarizer 20A and the second polarizer 20B are respectively arranged so that their polarizing axes are oriented differently from each other by 90 degrees. Thereby, light emitted from the illumination system 30 is transmitted through the liquid crystal layer or blocked.

The orientation of polarizing axis a of the first polarizer 20A (transmission axis) is determined by a magnitude relation between refractive index of a luminance enhancement film 33 in the extending direction of a convex portion 33a described later and refractive index of the luminance enhancement film 33 in the direction orthogonal to the extending direction of the convex portion 33a. Specifically, the orientation of the polarizing axis a of the first polarizer 20A is set so that the refractive index of the luminance enhancement film 33 in the direction in parallel with the polarizing axis a is smaller than the refractive index of the luminance enhancement film 33 in the direction orthogonal to the polarizing axis a.

In this embodiment, as will be described later, the refractive index of the luminance enhancement film 33 in the extending direction of the convex portion 33a is smaller than the refractive index of the luminance enhancement film 33 in the direction orthogonal to the extending direction of the convex portion 33a. Therefore, the polarizing axis a of the first polarizer 20A is oriented in the direction in parallel with the extending direction of the convex portion 33a. "Oriented in the direction in parallel" is a concept including not only the case that the polarizing axis a of the first polarizer 20A is oriented in parallel with the extending direction of the convex portion 33a, but also a case that the polarizing axis a of the first polarizer 20A is oriented in a direction crossing the extending direction of the convex portion 33a at an angle within a range from 0 degrees to 45 degrees both inclusive. As illustrated in FIG. 1, the polarizing axis a is preferably in parallel with the extending direction of the convex portion 33a. However, in the case where the orientation of the polarizing axis a is difficult to be aligned with the orientation of the extending direction of the convex portion 33a since there is other reason such as obtaining an appropriate angle luminance distribution and improving contrast of the liquid crystal display panel 10, the angel made by the polarizing axis a and the extending direction of the convex portion 33a may be widened. In this case, to improve the front luminance, the angle should be larger than 0 degrees and smaller than 45 degrees. The angle is more preferably larger than 0 degrees and smaller than 20 degrees.

In this embodiment, the luminance enhancement film 33 corresponds to a specific example of "optical film" of this embodiment, and the convex portion 33a corresponds to a specific example of "three-dimensional structure" of this embodiment.

The illumination system 30 has a light source 31. For example, in the illumination system 30, on the liquid crystal display panel 10 side of the light source 31, a diffusion sheet 32 and the luminance enhancement film 33 are arranged sequentially from the light source 31 side. Meanwhile, a reflective sheet 34 is arranged behind the light source 31. As described above, in this embodiment, the illumination system 30 is a so-called direct type, but the illumination system 30 may be, for example, a side-edge light type using a light guide plate.

In the light source 31, for example, a plurality of linear light sources 31a are arranged in parallel with an equal distance (for example, 20 mm). Examples of the linear light source 31a include a Hot Cathode Fluorescent Lamp (HCFL) and a Cold Cathode Fluorescent Lamp (CCFL). The light source 31 may be, for example, a light source in which point sources such as a Light Emitting Diode (LED) are two-dimensionally arranged, or a surface light source such as an organic Electro Luminescence (EL).

The reflective sheet 34 is, for example, a foamed PET (polyethylene terephthalate), a silver evaporated film, a multilayer reflective film or the like. By the reflective sheet 34, part of light emitted from the light source 31 is reflected in the direction of the liquid crystal display panel 10. Thereby, light emitted from the light source 31 is effectively used.

The diffusion sheet 32 is, for example, a diffusion plate formed by dispersing a diffusion material (filler) in a relatively thick plate-like transparent resin; a diffusion film formed by coating a relatively thin film-like transparent resin with a transparent resin (binder) containing a diffusion material; or a combination thereof. As the plate-like transparent resin or the film-like transparent resin, for example, PET, acryl, polycarbonate or the like is used. As the diffusion material, for example, an inorganic filler such as $SiO_2$, an organic filler such as acryl or the like is used.

Figure 2:
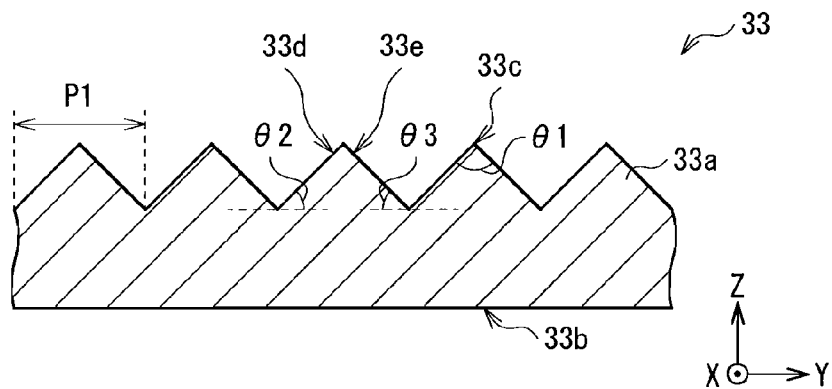
FIG. 2 is a cross sectional view illustrating an example of a structure of a luminance enhancement film of FIG. 1.

The luminance enhancement film 33 is arranged so that a face including the luminance enhancement film 33 is in parallel with the front face of the liquid crystal display panel 10. On the face (front face) on the light emitting side of the luminance enhancement film 33, as illustrated in FIG. 1 and FIG. 2, the plurality of columnar convex portions 33a (three-dimensional structure) extend in the horizontal direction (X-axis direction) in the plane on the light emitting side, and are sequentially arranged in parallel in the direction crossing the extending direction. FIG. 2 is an enlarged cross sectional view of an example of the luminance enhancement film 33. "In the horizontal direction" is a concept including not only the case that the plurality of columnar convex portions 33a extend in the horizontal direction, but also a case that the plurality of columnar convex portions 33a extend in a direction crossing the horizontal face at an angle within a range from 0 degrees to 45 degrees both inclusive. As illustrated in FIG. 1 and FIG. 2, it is preferable that the respective convex portions 33a extend in the horizontal direction and are sequentially arranged in parallel with the direction orthogonal to the extending direction (vertical direction, Y-axis direction). Meanwhile, the face (rear face 33b) on the light incidence side of the luminance enhancement film 33 is, for example, a plain face. For example, two dimensionally arranged convex portions (embossed pattern) may be formed on the rear face of the luminance enhancement film 33.

For example, as illustrated in FIG. 2, each convex portion 33a is in the shape of a triangle pole having inclined faces 33d and 33e contacted with a top 33c having apex angle θ1. The inclined faces 33d and 33e are arranged opposite to each other diagonally at base angles of θ2 and θ3 with respect to the face including the luminance enhancement film 33. A width in the arrangement direction of each convex portion 33a (pitch P1) is, for example, from 10 μm to 350 μm both inclusive. Each convex portion 33a is not limited to the shape of a triangle pole as illustrated in FIG. 2. For example, each convex portion 33a may be in the shape of a polygonal pole such as the shape of a pentagonal pole. Otherwise, each convex portion 33a may have a curved face shape (for example, cylindrical shape) such as an oval shape and an aspheric shape in the direction orthogonal to the extending direction of each convex portion 33a.

Further, each convex portion 33a does not necessarily have the same shape and the same size as those of other convex portions 33a. For example, a three-dimensional structure composed of a pair of 2 adjacent convex portions 33a having an identical shape in which one thereof is high (large) and the other thereof is low (small) may be arranged at an equal pitch in the arrangement direction. Otherwise, for example, a three-dimensional structure composed of a pair of 2 adjacent convex portions 33a having an identical height and a different shape may be arranged at an equal pitch in the arrangement direction. Otherwise, for example, a three-dimensional structure composed of a pair of 2 adjacent convex portions 33a having a different shape and a different size (height) may be arranged at an equal pitch in the arrangement direction. It is also possible to provide a plurality of convex portions and a plurality of concave sections in the extending direction of each convex portion 33a.

Thereby, each convex portion 33a improves the directivity by refracting and transmitting the component in the arrangement direction of each convex portion 33a among light entering from the rear face side 33b of the luminance enhancement film 33 in the direction orthogonal to the liquid crystal display panel 10. In each convex portion 33a, light focusing effect due to refraction effect by each convex portion 33a is little for the component in the extending direction of each convex portion 33a among light entering from the rear face 33b side of the luminance enhancement film 33.

In this embodiment, each convex portion 33a has refractive index anisotropy in which the refractive index in the extending direction of each convex portion 33a is smaller than the refractive index in the arrangement direction of each convex portion 33a. As described above, since the polarizing axis a of the first polarizer 20A is oriented in parallel with the extending direction of the convex portion 33a. Thus, in each convex portion 33a, the refractive index in the direction in parallel with the polarizing axis a is smaller than the refractive index in the direction orthogonal to the polarizing axis a.

As described above, in this embodiment, each convex portion 33a has in-plane refractive index anisotropy in which the refractive index in the direction in parallel with the polarizing axis a is smaller than the refractive index in the direction orthogonal to the polarizing axis a. Thereby, more light is reflected in the direction orthogonal to the polarizing axis a, return light is recycled, and thereby light in the direction in parallel with the polarizing axis a is increased. Therefore, transmissive characteristics of light entering the luminance enhancement film 33 is changeable according to polarization state. The recycle efficiency is better in the case where each convex portion 33a is provided on the light emitting side (front face), than in the case where each convex portion 33a is provided on the light incidence side (rear face) due to critical angles.

The refractive index in-plane anisotropy may be generated by stretching a sheet containing a semicrystalline resin or a crystalline resin in one direction. However, in this embodiment, the refractive index in-plane anisotropy is generated by using not stretching but the after-mentioned manufacturing method. Examples of materials exhibiting the refractive index in-plane anisotropy without stretching include a liquid crystalline polymer having orientation.

The liquid crystalline polymer is a polymer in which liquid crystal is formed. The liquid crystalline polymer is also referred to as a liquid crystal polymer, a polymer liquid crystal or the like. The liquid crystalline polymer is categorized into three types of structures, that is, main chain type, side chain type, and complex type. The main chain type includes a region exhibiting liquid crystallinity in a main chain. The side chain type includes a region exhibiting liquid crystallinity in a side chain. The complex type includes a region exhibiting liquid crystallinity both in a main chain and a side chain. Further, in addition to the foregoing categorizing method, the liquid crystalline polymer may be categorized in two types of thermotropic type (thermofusion type) and lyotropic type (solution type). The thermofusion type becomes in a state of liquid crystal by thermofusion. Examples of the thermofusion type include liquid crystal polymer (LCP). The solution type becomes in a state of liquid crystal by obtaining a solution state.

The liquid crystalline polymer is a material that is able to be formed by, for example, irradiating a composition of matter containing a rod-like liquid crystalline monomer and a photopolymerization initiator with ultraviolet and polymerizing the rod-like liquid crystalline monomer.

Next, a description will be given of a function of the luminance enhancement film 33 in the case that in the entire luminance enhancement film 33, the refractive index in the extending direction of each convex portion 33a is different from the refractive index in the arrangement direction of each convex portion 33a.

Figure 3:
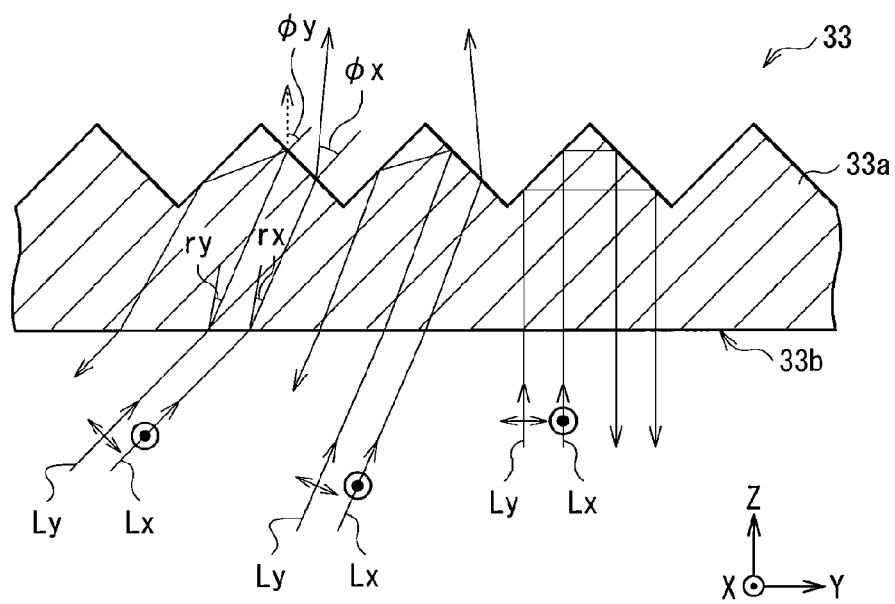
FIG. 3 is a conceptual diagram explaining optical characteristics of the luminance enhancement film of FIG. 1.

FIG. 3 illustrates an example of a light path when light of the illumination system 30 enters from the rear face of the luminance enhancement film 33, in the case where the entire luminance enhancement film 33 is made of a material in which refractive index nx in the extending direction of each convex portion 33a is smaller than refractive index ny in the arrangement direction of each convex portion 33a (nx<ny). In FIG. 3, Lx represents a polarization component oscillating in the extending direction (direction X) of each convex portion 33a among light of the illumination system 30, and Ly represents a polarization component oscillating in the arrangement direction (direction Y) of each convex portion 33a among light of the illumination system 30.

As illustrated in the left side of FIG. 3, the light of the illumination system 30 entering from the diagonal direction with respect to the face including the luminance enhancement film 33 is respectively refracted on the rear face of the luminance enhancement film 33 at refractive angle rx in the X-direction polarization component Lx of the light of the illumination system 30 and at refractive angle ry in the Y-direction polarization component Ly of the light of the illumination system 30 (rx<ry) that are different from each other. The light of the illumination system 30 is respectively emitted from the front face of the luminance enhancement film 33 (light emitting face of each convex portion 33a) at emission angles φx and φy (φx<φy) different from each other.

In the luminance enhancement film 33, the refractive index in the extending direction of each convex portion 33a is different from the refractive index in the arrangement direction of each convex portion 33a (nx<ny). Thus, the respective polarization components oscillating in the respective directions are reflected by the interface such as the rear face of the luminance enhancement film 33 and the light emitting face of the convex portion 33a at reflectance different from each other. Therefore, the reflection amount of Ly becomes larger than the reflection amount of Lx. Thus, in the light passing through the luminance enhancement film 33, the light amount of Lx becomes larger than the light amount of Ly.

In addition, the respective polarization components oscillating in the respective directions have a critical angle different from each other on the interface such as the rear face of the luminance enhancement film 33 and the light incidence face of the convex portion 33a. Therefore, for light entering at a certain incidence angle, in the case where the angle at which the light enters the light emitting face is larger than the critical angle of Ly and smaller than the critical angle of Lx, as illustrated in the center of FIG. 3, Ly is totally reflected and Lx is transmitted in the light emitting face. Therefore, a total polarization split state in which the polarization component Ly is repeatedly reflected totally by the light emitting face of each convex portion 33a to become return light, and only the polarization component Lx is transmitted through the light emitting face of each convex portion 33a is realized.

Further, if the incidence angle of light of the illumination system 30 with respect to the light emitting face of each convex portion 33a is excessively large, as illustrated in the right side of FIG. 3, the light of the illumination system 30 is repeatedly reflected totally by the light emitting face of each convex portion 33a to become return light back to the illumination system 30 side regardless of the polarization state.

Light reflected by the front face or the rear face of the luminance enhancement film 33 is reflected by the front face of the reflective sheet 34 (FIG. 1) or the diffusion sheet 32 of the illumination system 30, unpolarized, and again enters the luminance enhancement film 33. Thereby, a light amount of one polarization component (Lx) is significantly larger than a light amount of the other polarization component (Ly). As a result, light utilization efficiency is and the front luminance are more improved than in a case in which each convex portion 33a does not have the polarization split action.

In the case where the luminance enhancement film 33 is bonded to a light transmission film (not illustrated) from the rear face 33b side, or only the convex portion 33a of the luminance enhancement film 33 has in-plane refractive index anisotropy, a face contacting with the light transmission film or a bottom of the convex portion 33a functions as the rear face 33b in the case where the whole luminance enhancement film 33 has refractive index anisotropy. Therefore, in the case where the luminance enhancement film 33 is bonded to the light transmission film from the rear face 33b side, or only the convex portion 33a of the luminance enhancement film 33 has refractive index anisotropy, an optical function similar to that in the case where the whole luminance enhancement film 33 has in-plane refractive index anisotropy is produced.

As described above, the luminance enhancement film 33 improves not only light focusing action, but also front luminance by polarization split action.

Next, a description will be given of an example of methods of forming the luminance enhancement film 33 with reference to FIGS. 4A and 4B, FIGS. 5A and 5B, FIG. 6, FIGS. 7A to 7C, and FIG. 8. FIGS. 4A and 4B, FIGS. 5A and 5B, and FIGS. 7A to 7C illustrate a cross sectional structure explaining a formation process of the luminance enhancement film 33. FIG. 6 is a perspective view illustrating the step of FIG. 5B. FIG. 8 illustrates an example of DSC curved line of the rod-like liquid crystalline monomer. In FIG. 8, $T_1$ represents a phase transition temperature (melting point) to a liquid crystal phase, and $T_2$ represents a phase transition temperature to an isotropic phase.

Figure 4A:
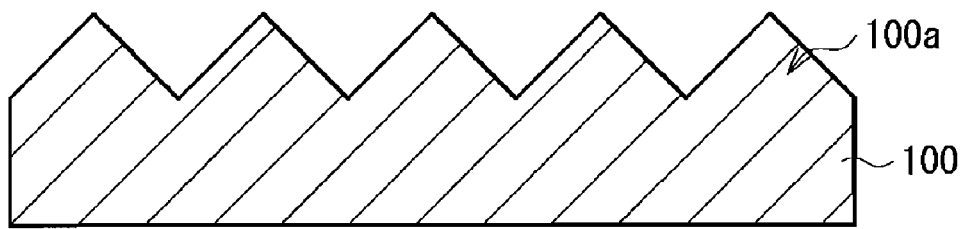
FIGS. 4A and 4B are cross sectional views for explaining an example of a method of forming the luminance enhancement film of FIG. 1.

First, a base 100 having a plurality of convex portions 100a that are sequentially arranged in one plane and that have in-plane shape anisotropy is prepared (see FIG. 4A). A concave-convex shape formed from the plurality of convex portions 100a of the base 100 is an opposite shape of a concave-convex shape formed from the plurality of convex portions 33a that are two dimensionally arranged on the luminance enhancement film 33. The surface of the concave-convex shape is preferably coated with, for example, a silicon mold release agent or a fluorine mold release agent. Further, a composition of matter 110 (liquid crystal adjustment powder) obtained by mixing a rod-like liquid crystalline monomer and a photopolymerization initiator is prepared.

Figure 4B:
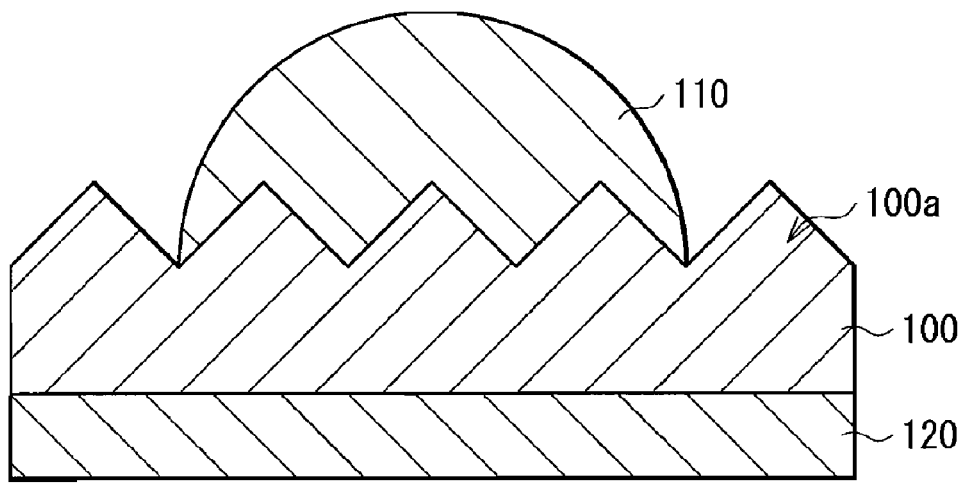

Next, the base 100 is placed on a hot plate 120, and heated at the melting point $T_1$ (see FIG. 8) of the rod-like liquid crystalline monomer contained in the composition of matter 110 or more. After that, the composition of matter 110 (liquid crystal adjustment powder) is dropped down onto the convex portions 100a of the base 100 (FIG. 4B). The composition of matter 110 is fused, the viscosity of the composition of matter 110 is lowered, and the composition of matter 110 is contacted with the convex portion 100a with no space.

Figure 5A:
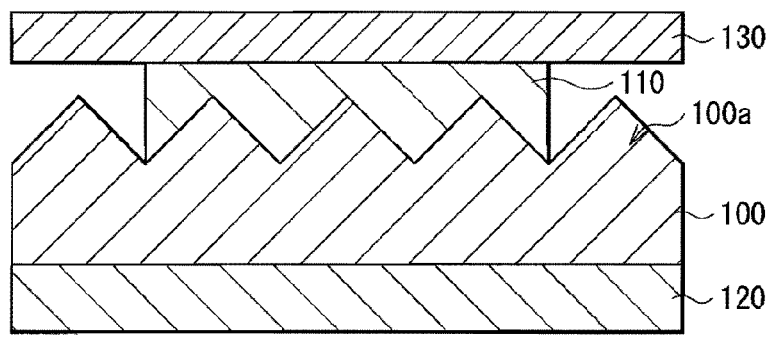
FIGS. 5A and 5B are cross sectional views explaining steps following FIGS. 4A and 4B.
Figure 6:
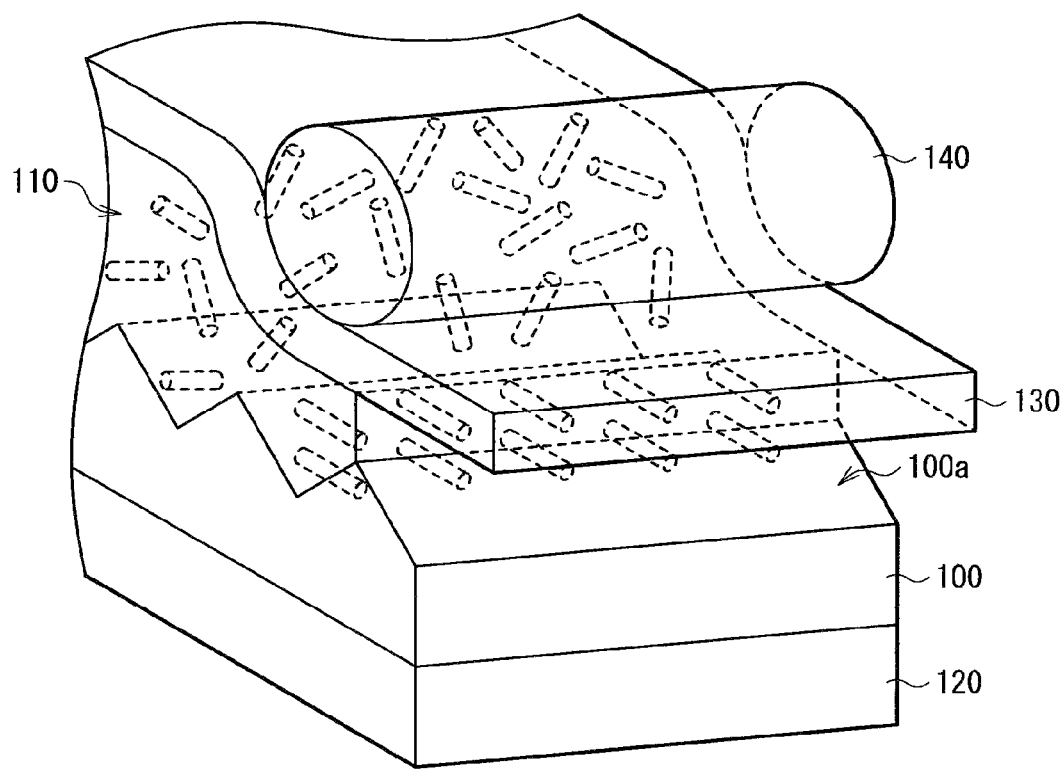
FIG. 6 is a schematic view schematically illustrating a state of alignment in the steps of FIGS. 5A and 5B.

Next, a light transmission film 130 is laid on the composition of matter 110 while the temperature of the hot plate 120 is kept at the melting point $T_1$ or more (FIG. 5A). It is preferable that an oriented film for aligning the rod-like liquid crystalline monomer in the arrangement direction of the convex portion 100a is provided on the surface contacted with the composition of matter 110 of the light transmission film 130.

Figure 5B:
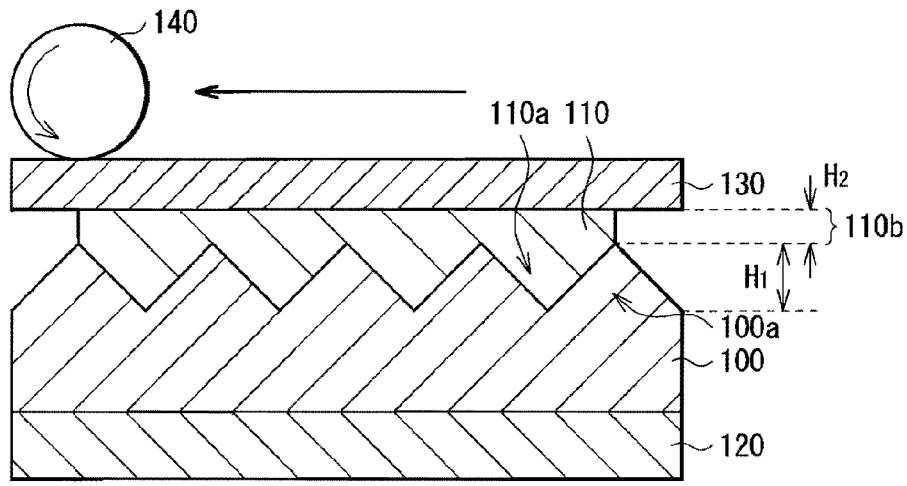

In the state that the composition of matter 110 is retained between the base 100 and the light transmission film 130 arranged oppositely to the convex portion 100a of the base 100 as described above, the composition of matter 110 is heated at temperature of the melting point $T_1$ or more and the phase transition temperature T2 or less, and pressed. Specifically, as illustrated in FIG. 5B, while a pressure roller 140 is rolled on the light transmission film 130 in the arrangement direction of the convex portion 100a, the composition of matter 110 is pressed to the convex portion 100a of the base 100 with the light transmission film 130 in between. Thereby, the composition of matter 110 is pressed and moved in the arrangement direction of the convex portion 100a in a valley between adjacent convex portions 100a. As a result, as illustrated in FIG. 6, liquid crystal of the composition of matter 110 is oriented in the arrangement direction of the convex portion 100a. Further, as illustrated in FIG. 5B, an optical function layer having a convex portion 110a with a height $H_1$ and a skirt 110b with a thickness $H_2$ is formed in the composition of matter 110.

In the case where the surface of the convex portion 100a is coated with the foregoing mold release agent, it is possible that the rod-like liquid crystalline monomer is promoted to align the arrangement direction of the convex portion 100a by anchor effect of the mold release agent. Further, in the case where the foregoing oriented film is provided on the surface contacted with the composition of matter 110 of the light transmission film 130, it is also possible that the rod-like liquid crystalline monomer is promoted to align in the arrangement direction of the convex portion 100a.

Figure 7A:
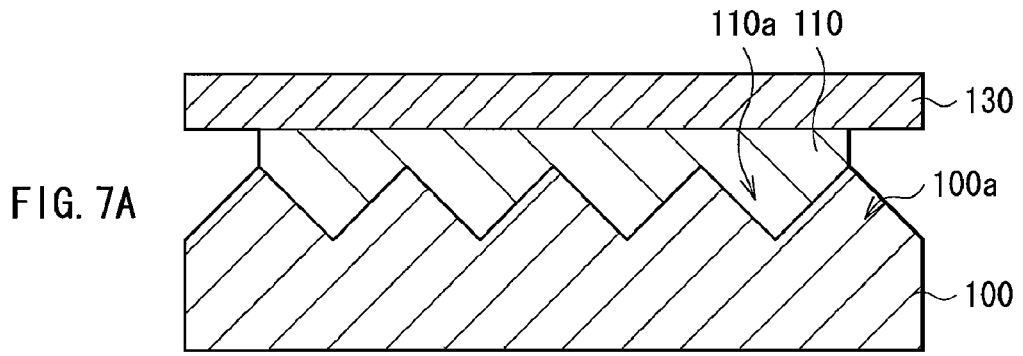
FIGS. 7A to 7C are cross sectional views explaining steps following FIG. 6.
Figure 7B:
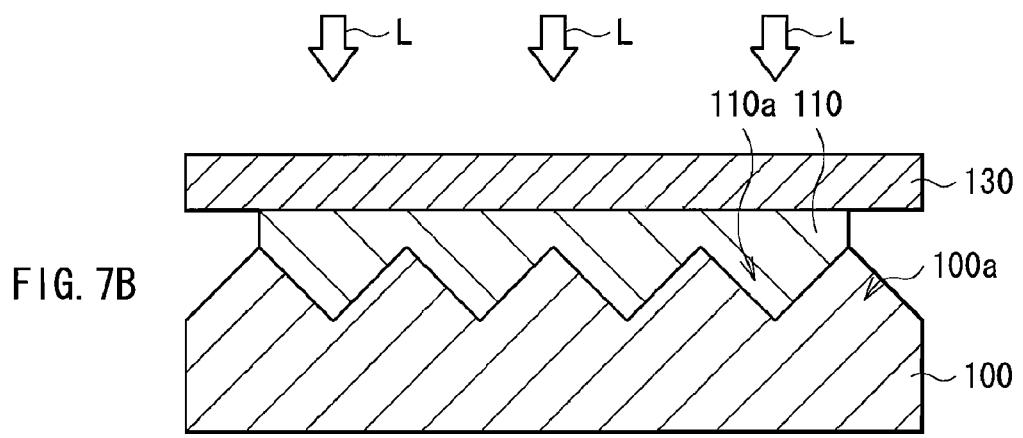
Figure 7C:
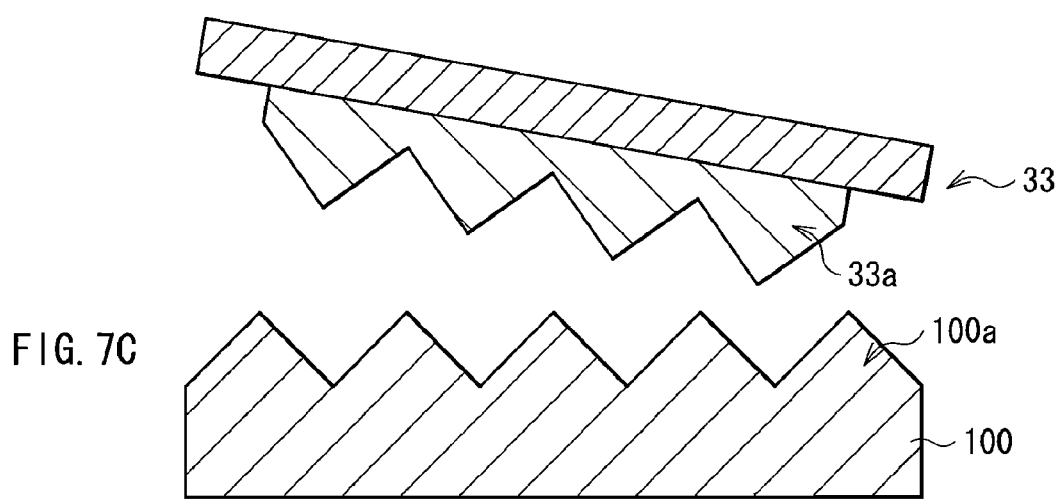
Figure 8:
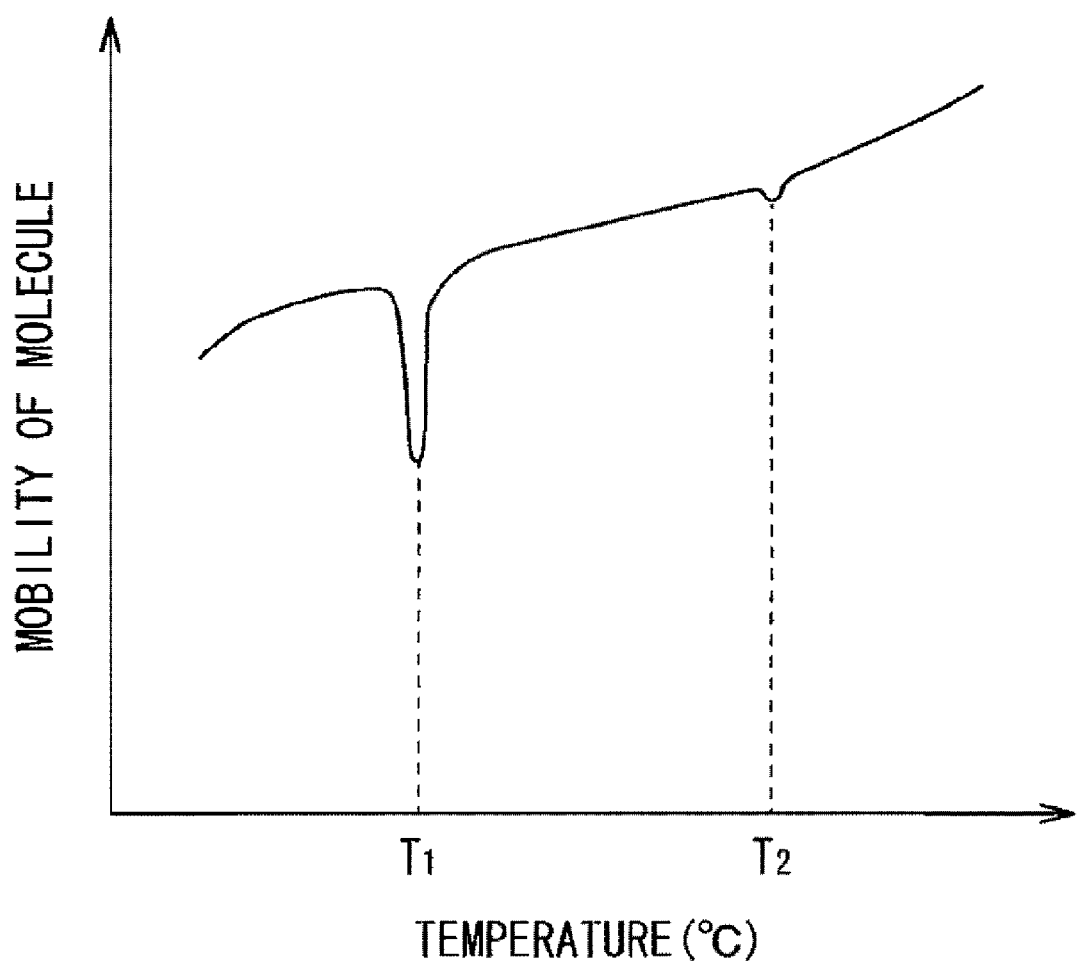
FIG. 8 is a characteristics diagram for explaining a DSC curved line.

After that, the hot plate 120 is removed from the base 100, and the left and cooled to ambient temperature (FIG. 7A). Next, the composition of matter 110 is irradiated with ultraviolet L. For example, as illustrated in FIG. 7B, the composition of matter 110 is irradiated with the ultraviolet L from the light transmission film 130 side, and the rod-like liquid crystalline monomer contained in the composition of matter 110 is polymerized from the light transmission film 130 side. Thereby, the rod-like liquid crystalline monomer becomes a liquid crystalline polymer having orientation in the arrangement direction of the convex portion 100a. Finally, the light transmission film 130 is separated from the base 100 (FIG. 7C). Accordingly, the luminance enhancement film 33 including the composition of matter 110 containing the liquid crystalline polymer having orientation and the light transmission film 130 is formed.

The luminance enhancement film 33 may be also formed by, for example, the following method.

Figure 9:
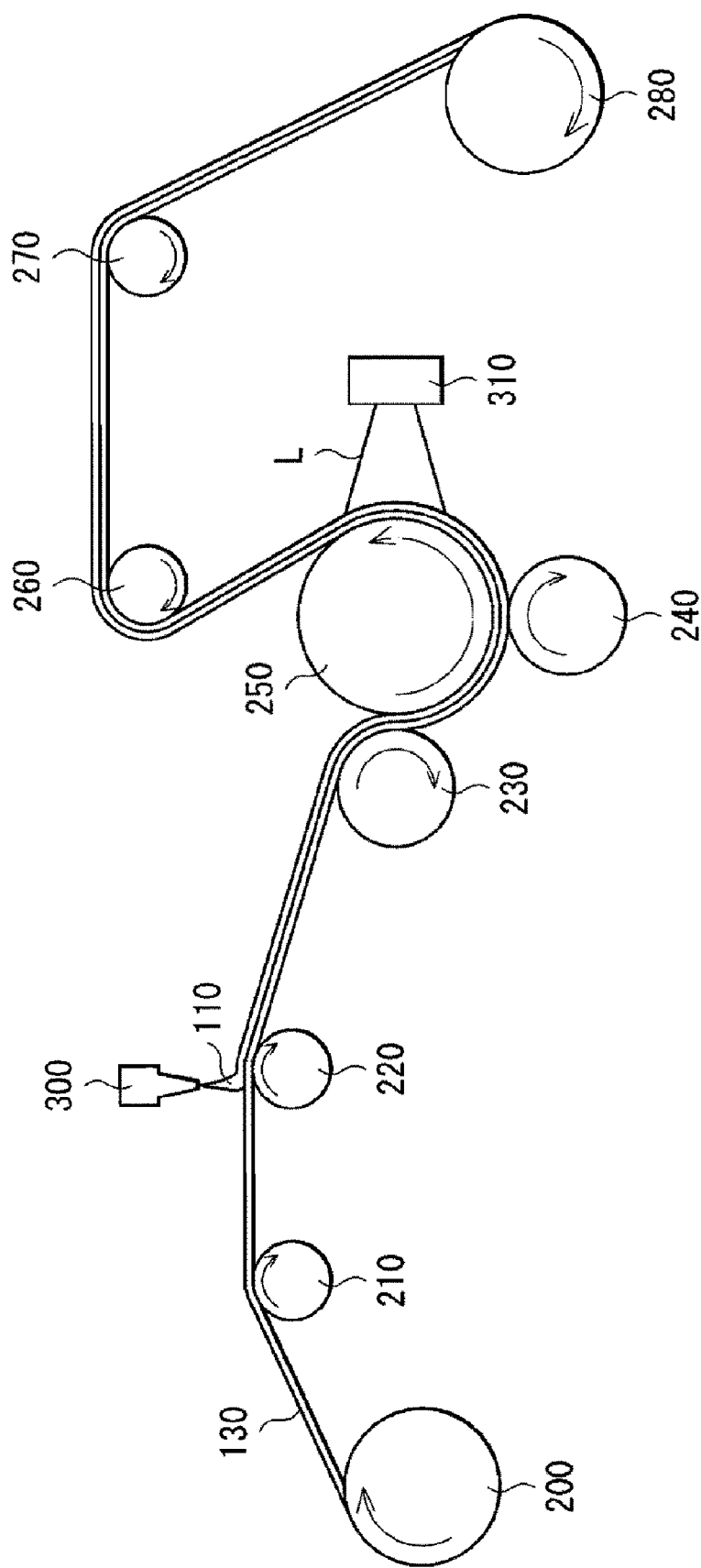
FIG. 9 is a schematic configuration view of a manufacturing equipment for forming the luminance enhancement film of FIG. 1 by another method.

FIG. 9 illustrates an example of a manufacturing equipment of the luminance enhancement film 33. The manufacturing equipment includes a winding-off roll 200, guide rolls 210, 260, and 270, heat rolls 220 and 230, a temperature adjustment roll 240 (pressure roller), a temperature adjustment roll 250, a discharger 300, and an ultraviolet irradiator 310. The winding-off roll 200 is a roll winding the light transmission film 130 in a concentric fashion, and is intended to supply the light transmission film 130. The light transmission film 130 wound off from the winding-off roll 200 is transferred in the order of the guide roll 210, the heat roll 220, the heat roll 230, the temperature adjustment roll 240, the guide roll 260, and the guide roll 270. Finally, the light transmission film 130 is wound up by a winding-up roll 280. The temperature adjustment roll 250 is arranged leaving a given space from the heat roll 230 and the temperature adjustment roll 240. As a discharger, the discharger 300 is provided leaving a given space from a section contacted with the heat roll 220 out of the light transmission film 130 supplied from the winding-off roll 200. The ultraviolet irradiator 310 irradiates a portion that has passed the heat roll 230 and that is contacted with the temperature adjustment roll 250 of the light transmission film 130 supplied from the winding-off roll 200 with ultraviolet.

The guide roll 210 guides the light transmission film 130 supplied from the winding-off roll 200 to the heat roll 220. The heat roll 220 is able to generate heat from ambient temperature to about 200 deg C., and is set at, for example, heating temperature of the melting point $T_1$ or more. The discharger 300 is provided leaving a given space from a portion contacted with the heat roll 220 of the light transmission film 130 supplied from the winding-off roll 200. The discharger 300 is intended to drop the composition of matter 110 obtained by mixing a photopolymerization initiator with a thermal fused rod-like liquid crystalline monomer that is heated at the melting point $T_1$ or more down onto the light transmission film 130. The heat roll 230 is able to generate heat from ambient temperature to about 200 deg C., and is set at, for example, the melting point $T_1$ or more. The temperature adjustment rolls 240 and 250 are able to adjust temperature from ambient temperature to about 90 deg C., and is set at, for example, cooling temperature lower than the phase transition temperature $T_2$ (ambient temperature). Further, on the circumferential face of the temperature adjustment roll 250, a plurality of convex portions that extend in a direction in parallel with the rotation axis of the temperature adjustment roll 250, and are arranged in parallel continuously in the direction orthogonal to the rotation axis of the temperature adjustment roll 250 are formed. Concave-convex shape formed from the plurality of convex portions formed on the circumferential face is the opposite shape of the concave-convex shape formed from the plurality of convex portions 33a that are two dimensionally arranged on the luminance enhancement film 33. The guide roll 260 is intended to separate the light transmission film 130 wound around the temperature adjustment roll 250. The guide roll 270 is intended to guide the light transmission film 130 separated by the guide roll 260 to the winding-up roll 280.

The luminance enhancement film 33 is formed by using the manufacturing equipment having the foregoing configuration. Specifically, first, the light transmission film 130 wound off from the winding-off roll 200 is guided to the heat roll 220 through the guide roll 210. After that, the composition of matter 110 obtained by mixing the photopolymerization initiator with the thermal fused rod-like liquid crystalline monomer is dropped down onto the light transmission film 130 from the discharger 300. The composition of matter 110 dropped from the discharger 300 is heated up to the melting point $T_1$ (see FIG. 8) or more by the heat roll 220. After that, while temperature of the composition of matter 110 on the light transmission film 130 is maintained at the melting point $T_1$ or more by the heat roll 230, the composition of matter 110 is pressed to the convex portions formed on the circumferential face of the temperature adjustment roll 250. Thereby, the composition of matter 110 is contacted with the convex portions of the temperature adjustment roll 250 with no space. The composition of matter 110 is pressed and moved in the arrangement direction of the convex portion in a valley between adjacent convex portions. As a result, the liquid crystal of the composition of matter 110 is oriented in the arrangement direction of the convex portion of the temperature adjustment roll 250. Further, the optical function section layer having the convex portion 110a with the height $H_1$ and the skirt 110b with the thickness $H_2$ is formed in the composition of matter 110.

After that, the composition of matter 110 is cooled down by the temperature adjustment rolls 240 and 250 to temperature lower than the phase transition temperature T2. The cooled composition of matter 110 is irradiated with the ultraviolet L from the ultraviolet irradiator 310. Thereby, the rod-like liquid crystalline monomer contained in the composition of matter 110 is polymerized from the light transmission film 130 side, and thus, the rod-like liquid crystalline monomer becomes the liquid crystalline polymer having orientation in the arrangement direction of the convex portion of the temperature adjustment roll 250. Finally, the light transmission film 130 is separated from the temperature adjustment roll 250 by the guide roll 260. After that, the light transmission film 130 is wound up by the winding-up roll 280 through the guide roll 270. Accordingly, the luminance enhancement film 33 including the composition of matter 110 containing the liquid crystalline polymer having orientation and the light transmission film 130 is formed.

In the case where the luminance enhancement film 33 is manufactured by the foregoing respective manufacturing methods, the thickness $H_2$ of the skirt 110b is preferably 40% or less of the height $H_1$ of the convex portion 110a.

Figure 10:
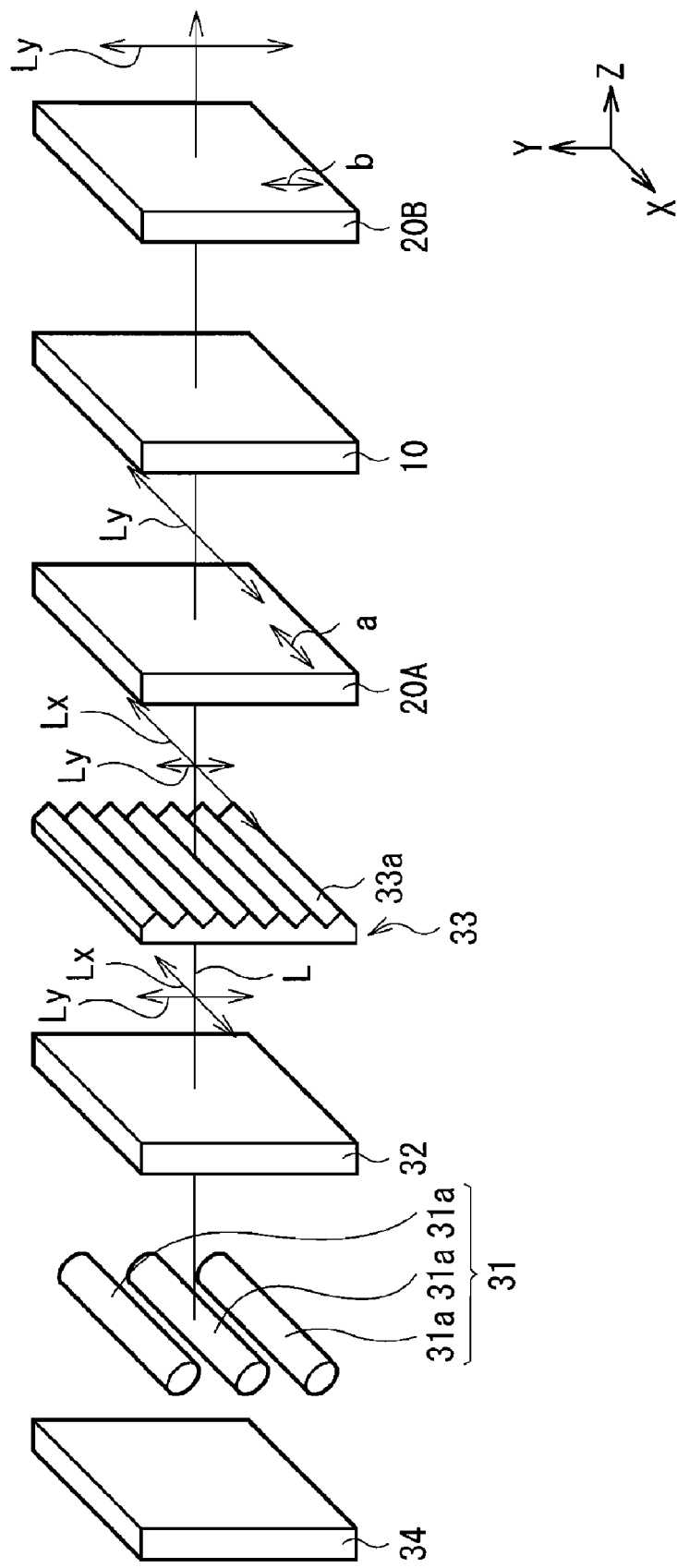
FIG. 10 is a schematic configuration view explaining operation of the display unit of FIG. 1.

Next, a description will be given of an action in displaying an image in the display unit 1 of this embodiment with reference to FIG. 10. FIG. 10 is a schematic view illustrating an example of the action of the display unit 1.

Unpolarized light L that has been irradiated from the light source 31 and transmitted through the diffusion sheet 32 enters the rear face of the luminance enhancement film 33, and directivity thereof is improved by light focusing action of the convex portion 33a. At this time, the light L is split into the polarization component (Lx) in parallel with the polarizing axis a of the first polarizer 20A and the polarization component (Ly) orthogonal to the polarizing axis a of the first polarizer 20A by polarization split action of the convex portion 33a. After that, the polarization component (Lx) in parallel with the polarizing axis mostly a enters the first polarizer 20A.

Among light L entering the first polarizer 20A, the polarization component (Ly) crossing the polarizing axis a is absorbed into the first polarizer 20A, and the polarization component (Lx) in parallel with the polarizing axis a is transmitted through the first polarizer 20A. Polarization component Lx that has transmitted through the first polarizer 20A is provided with polarization control in pixel unit in the liquid crystal display panel 10 and enters the second polarizer 20B. Only the polarized light of the polarizing axis b of the second polarizer 20B is transmitted to form an image on the front face of the panel. Accordingly, the image is displayed in the display unit 1.

In this embodiment, the convex portion 33a having shape anisotropy in one plane of the luminance enhancement film 33 contains the liquid crystalline polymer having orientation in the foregoing one plane. The convex portion 33a has refractive index anisotropy according to the orientation of the liquid crystalline polymer. The liquid crystalline polymer having orientation may be formed by the foregoing methods. Further, since liquid crystalline polymer is difficult to have orientation by stretching, the luminance enhancement film 33 of this embodiment is not formed by using stretching, but is formed by the foregoing exemplified methods. Thereby, since the shape of the convex portion 33a of the luminance enhancement film 33 has not been lost by stretching, the luminance enhancement film 33 that includes the convex portion 33a keeping the shape and having refractive index anisotropy is achieved.

Further, in the method of manufacturing the luminance enhancement film 33 of this embodiment, the foregoing respective treatments of heating, pressing, cooling, and ultraviolet irradiation are sequentially performed for the composition of matter 110 containing the rod-like liquid crystalline monomer and the photopolymerization initiator. Thereby, the refractive index anisotropy is generated in the convex portion 33a of the luminance enhancement film 33. Accordingly, without using stretching, the refractive index anisotropy is able to be given to the convex portion 33a of the luminance enhancement film 33. Thereby, the convex portion 33a having refractive index anisotropy is accurately formed.

EXAMPLES

A description will be given of Examples 1 and 2 of the luminance enhancement film 33 of the foregoing embodiment in contrast with Comparative examples 1, 2, and 3. In Examples 1 and 2 and Comparative examples 2 and 3, a rod-like liquid crystalline monomer was contained in the composition of matter 110 used in the manufacturing process. In Example 1 and Comparative example 2, as the rod-like liquid crystalline monomer, high Δn type was used. In Example 2 and Comparative example 3, as the rod-like liquid crystalline monomer, low Δn type was used. In Comparative example 1, instead of the rod-like liquid crystalline monomer, a light curing acryl monomer was contained in the composition of matter 110. Further, in the examples and Comparative example 1, the pressing direction in the manufacturing process was the arrangement direction of the convex portion 100a of the base 100 (or convex portion of the temperature adjustment roll 250). In Comparative example 2, the pressing direction in the manufacturing process was the extending direction of the convex portion 100a of the base 100 (or convex portion of the temperature adjustment roll 250).

In the examples and Comparative examples 1 and 2, the shape of the convex portion of the luminance enhancement film was a rectangular isosceles triangle pole, and the width of the convex portion of the luminance enhancement film was 25 μm, and the height thereof was 12.5 μm. Further, as the light transmission film 130, a PET film was used.

A description will be given of a specific manufacturing method taking Example 2 as an example. First, a commercially available liquid crystalline monomer solution (RMS03-001c, including a polymerization initiator, phase transition temperature to isotropic phase: 70 deg C., Merck & Co., Inc, make) was heated on a hot plate at 150 deg C. for 1 minute. After a solvent was evaporated, a composition of matter remaining on the hot plate (mixed solution of the liquid crystalline monomer and the polymerization initiator) was moved to a Ni electroformed prism base (isosceles triangle having an apex angle of 90 degrees, pitch: 25 μm, height: 12.5 μm) that was heated on a hot plate at a phase transition temperature to isotropic phase (50 deg C.) or less. Next, while temperature of the hot plate was retained at 50 deg C., the composition of matter on the Ni electroformed prism base was sealed by the PET film. After that, while a roller was rolled on the PET film in the arrangement direction of prism, the roller was strongly pressed to the PET film, and thereby the thickness of the composition of matter was reduced uniformly. After that, the hot plate was removed from the Ni electroformed prism base. The composition of matter on the Ni electroformed prism base was left and cooled down to ambient temperature. After that, the composition of matter was irradiated with UV from the PET film side, and thereby the liquid crystalline monomer in the composition of matter was polymerized. After that, the composition of matter was separated from the Ni electroformed prism base, and thereby the light transmission film of Example 2 was obtained.

Cross sectional shape

Cross sections in the arrangement direction of the luminance enhancement film were measured by using a scanning confocal laser microscopy (LEXT OLS3000, Olympus Corporation make). As a result, in Examples 1 and 2 and Comparative examples 1, 2, and 3, the cross sections of the luminance enhancement films were respectively in the shape of rectangular isosceles triangle having the same apex angle of 90 degrees and the same base angle of 45 degrees as the concave-convex shape of the base 100. Accordingly, it was found that the shape of the convex portion of the luminance enhancement film was kept.

Birefringence

Figure 11:
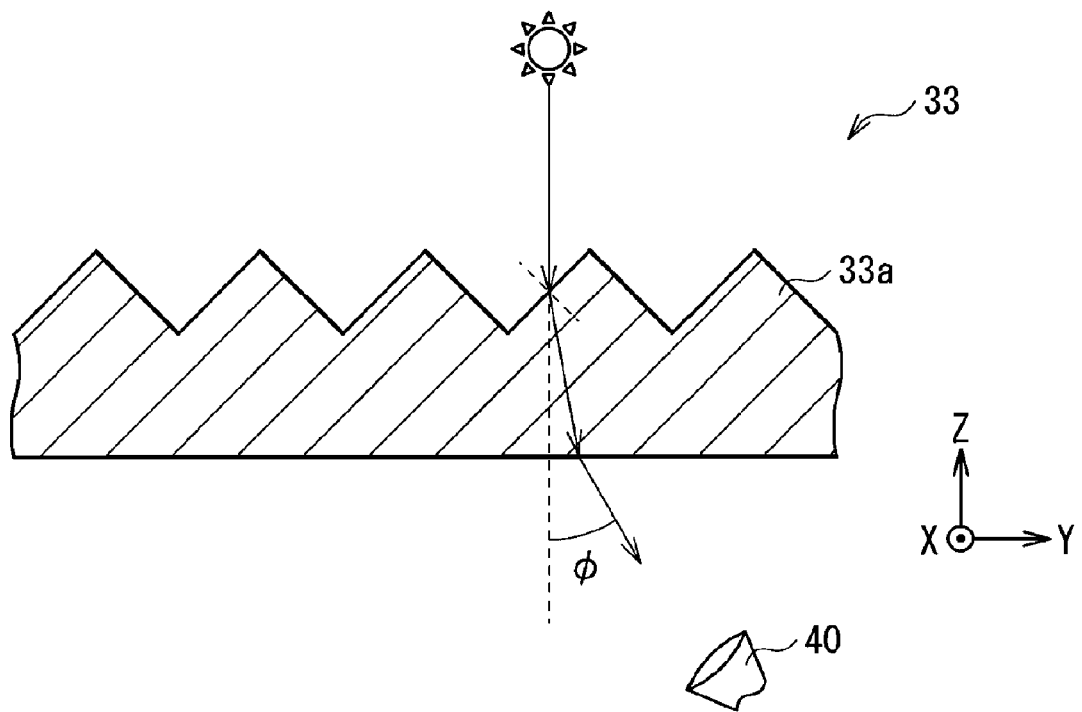
FIG. 11 is a conceptual view explaining an example of a method of measuring birefringence.
Figure 12:
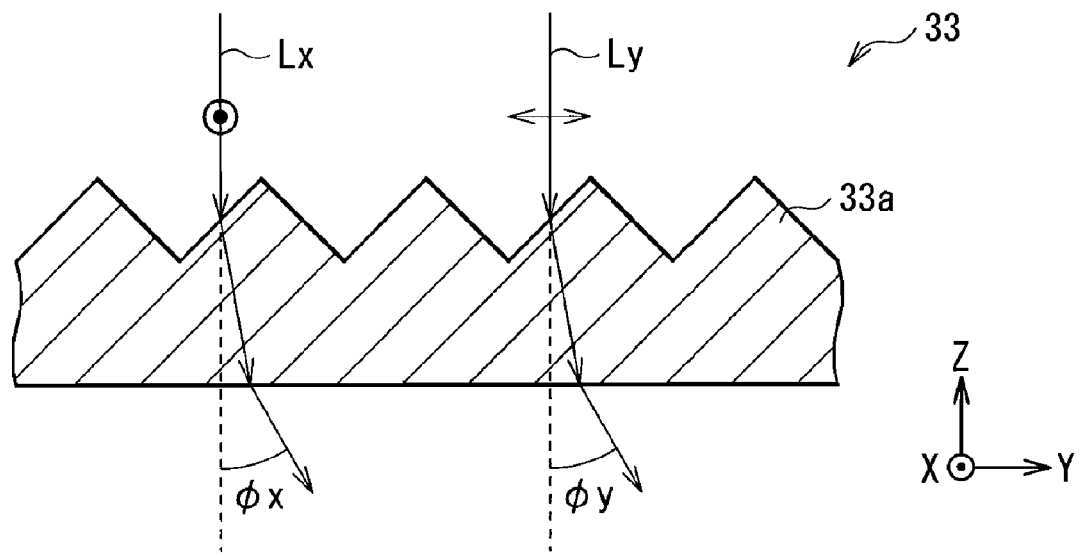
FIG. 12 is a conceptual view explaining a polarizing axis of birefringence.

Next, the birefringence of the luminance enhancement film was measured. To measure the birefringence, as illustrated in FIG. 11, polarized light was perpendicularly entered from the convex portion 33a side of the luminance enhancement film 33, the transmitted light was detected by a measure 40, and difference $\Delta n$ (=nx-ny) between the refractive index nx in the extending direction of the convex portion 33a and the refractive index ny in the arrangement direction of the convex portion 33a was calculated based on the difference of the emission angle $\phi$ of the transmitted light. As illustrated in FIG. 12, where the polarization component oscillating in the extending direction of the convex portion 33a was the perpendicular polarization Lx, and the polarization component oscillating in the arrangement direction of the convex portion 33a was the horizontal polarization Ly, the emission angle $\phi x$ of the perpendicular polarization Lx was smaller than the emission angle $\phi y$ of the horizontal polarization Ly.

As a result of the measurement, in Example 1, the refractive index nx in the extending direction of the luminance enhancement film was 1.54, and the refractive index ny in the arrangement direction was 1.87. Thus, the difference between the refractive indices $\Delta n$ was −0.33. Further, in Example 2, the refractive index nx in the extending direction of the luminance enhancement film was 1.55, and the refractive index ny in the arrangement direction was 1.70. Thus, the difference between the refractive indices $\Delta n$ was −0.15. Accordingly, it was found that by using the rod-like liquid crystalline monomer, refractive index anisotropy in which the refractive index nx in the extending direction of the luminance enhancement film was lower than the refractive index ny in the arrangement direction could be generated. Meanwhile, in Comparative example 1, the refractive index nx in the extending direction of the luminance enhancement film was 1.59, and the refractive index ny in the arrangement direction was 1.59. Thus, the difference between the refractive indices $\Delta n$ was 0.00. Accordingly, it was found that in the case where the light curing acryl monomer was used, refractive index anisotropy was not generated. Further, in Comparative example 2, the refractive index nx in the extending direction of the luminance enhancement film was 1.87, and the refractive index ny in the arrangement direction was 1.54. Thus, the difference between the refractive indices $\Delta n$ was +0.33. Further, in Comparative example 3, the refractive index nx in the extending direction of the luminance enhancement film was 1.70, and the refractive index ny in the arrangement direction was 1.55. Thus, the difference between the refractive indices $\Delta n$ was +0.15. Accordingly, it was found that even if the rod-like liquid crystalline monomer was used, in the case where the pressing direction in the manufacturing process was the extending direction of the convex portion 100a of the base 100 (or the convex portion of the temperature adjustment roll 250), refractive index anisotropy in which the refractive index nx in the extending direction of the luminance enhancement film was lower than the refractive index ny in the arrangement direction was not generated.

While the application has been described with reference to the embodiment and the examples, the application is not limited to the embodiment and the like, and various modifications may be made.

Further, in the foregoing embodiment and the like, the configuration of the liquid crystal display has been specifically described. However, it is not necessary to provide all layers. In addition, other layer may be provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. An optical film comprising:
   a plurality of three-dimensional structures extending in one direction and arranged sequentially in an arrangement direction crossing the one direction, wherein
   the three-dimensional structures contain a liquid crystalline polymer having an orientation in the arrangement direction, and have refractive index anisotropy in which refractive index in the extending direction of the three-dimensional structures is smaller than refractive index in the direction crossing the extending direction of the three-dimensional structures.

2. The optical film according to claim 1, wherein the liquid crystalline polymer is formed by irradiating a composition of matter containing a rod-like liquid crystalline monomer having orientation in the arrangement direction of the three-dimensional structures and a photopolymerization initiator with ultraviolet, and thereby polymerizing the rod-like liquid crystalline monomer.

3. The optical film according to claim 1, wherein the three-dimensional structures are polygonal columnar prisms or lenticular lenses including a convex curved face.

4. The optical film according to claim 1 comprising:

a light transmission film: and an optical function layer formed on the light transmission film, wherein the three-dimensional structures are provided on a surface on the side opposite to the light transmission film of the optical function layer, and of the optical function layer, a thickness between the three-dimensional structure and the light transmission film is 40% or less of a height of the three-dimensional structures.

5. A display unit comprising:

a panel driven based on an image signal;

a pair of polarizers sandwiching the display panel;

a light source illuminating the panel; and an optical film provided between the polarizer and the light source, wherein the optical film includes a plurality of three-dimensional structures extending in one direction and arranged sequentially in an arrangement direction crossing the one direction, and the three-dimensional structures contain a liquid crystal-line polymer having an orientation in the arrangement direction, and have refractive index anisotropy in which refractive index in the extending direction of the three-dimensional structures is smaller than refractive index in the direction crossing the extending direction of the three-dimensional structures.

6. The display unit according to claim 5, wherein a direction of the smallest refractive index in the three-dimensional structures is in parallel with a direction of a light transmission axis of the polarizer on the light source side, or crosses the direction of the light transmission axis of the polarizer on the light source side at an angle within a range from 0 degrees to 45 degrees both inclusive.

* * * * *